US008754751B1

(12) United States Patent
Picolli

(10) Patent No.: US 8,754,751 B1
(45) Date of Patent: Jun. 17, 2014

(54) RFID BASED SYSTEM AND METHOD FOR VEHICLE AND DRIVER VERIFICATION

(75) Inventor: Richard Picolli, Rutherford, NJ (US)

(73) Assignee: GTBM, Inc., E. Rutherford, NJ (US)

( * ) Notice: Subject to any disclaimer, the term of this patent is extended or adjusted under 35 U.S.C. 154(b) by 193 days.

(21) Appl. No.: 13/525,943

(22) Filed: Jun. 18, 2012

(51) Int. Cl.
| | |
|---|---|
| H04M 1/00 | (2006.01) |
| H04Q 5/22 | (2006.01) |
| G08C 19/16 | (2006.01) |
| G08B 1/08 | (2006.01) |
| G08B 13/14 | (2006.01) |
| G01P 5/00 | (2006.01) |
| G01S 13/75 | (2006.01) |
| G06K 7/10 | (2006.01) |
| G07B 15/06 | (2011.01) |
| B60R 25/102 | (2013.01) |

(52) U.S. Cl.
CPC .............. G01S 13/75 (2013.01); G06K 7/10346 (2013.01); G07B 15/063 (2013.01); B60R 25/102 (2013.01)
USPC ..................... 340/10.1; 340/12.1; 340/539.13; 340/572.4; 340/686.1; 455/562.1; 455/41.1; 73/514.01; 73/510

(58) Field of Classification Search
CPC ....... G01S 13/75; G01S 13/878; G06K 17/00; G06K 17/0025; G08C 2201/94; G07B 15/063
See application file for complete search history.

(56) References Cited

U.S. PATENT DOCUMENTS

| | | | |
|---|---|---|---|
| 6,876,296 B2 * | 4/2005 | Talmadge et al. .......... 340/10.42 |
| 7,096,102 B1 | 8/2006 | Parker, Sr. |
| 8,089,340 B2 | 1/2012 | Cochran et al. |
| 2005/0285743 A1 * | 12/2005 | Weber ........................ 340/572.1 |
| 2011/0063079 A1 * | 3/2011 | Groft et al. ................... 340/10.1 |

FOREIGN PATENT DOCUMENTS

WO   WO 2008/020771 A1   2/2008

* cited by examiner

*Primary Examiner* — Fekadeselassie Girma
(74) *Attorney, Agent, or Firm* — Robert Gorman; Gorman Law Offices

(57) ABSTRACT

An apparatus and system that provides for the wireless receiving, storing and analysis of digital data as part of an RFID enabled motor vehicle license plate in wireless communication with a mobile interrogator for obtaining data such as license plate number and optionally, a VIN. When combined with additional RFID tags, information such as wireless driver license data retrieval, VIN, and other user defined information such as data relating to insurance policy information, addresses, registration information, driving records, driving restrictions and the like may be accessed. Data is wirelessly passed upon receipt of a valid request signal from a law enforcement vehicle, through a law enforcement portal to centralized databases in order analyze and verify the same. The invention also provides for non-law enforcement information such as parking and repossession information, which would be similarly processed for parking and repossession agents, but through separate non-law enforcement databases.

8 Claims, 8 Drawing Sheets

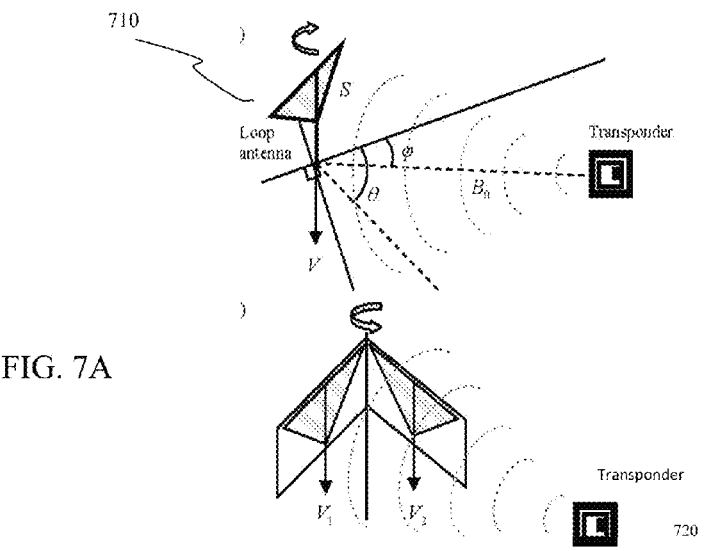
FIG. 7A
FIG. 7B
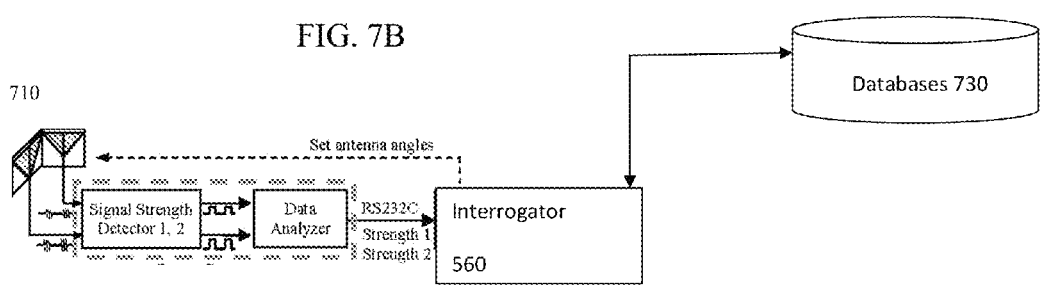

RFID BASED SYSTEM AND METHOD FOR VEHICLE AND DRIVER VERIFICATION

BACKGROUND OF THE INVENTION

1. Field of the Invention

The present invention relates generally to wireless data transfer systems and analysis thereof, more particularly, to a motor vehicle license plate with integral wireless tracking and data dissemination device and associated portal, for interacting with same and for transmission of data for analysis at a centralized location.

2. Description of the Related Art

Terrorists, criminals, and others who are hiding from the law can travel about easily in motor vehicles as passenger given the anonymity of motor vehicles, they can often move freely with little danger of being caught. Even in cases where pulled over for a minor travel violation, they are often released without the law enforcement officer even knowing their true identity. Law enforcement current processes involve a manual system where an officer needs to gather information and uses a manual call to a dispatch center in order to either verify the information being provided, or to input information from his on-board computer in the squad car. Due to lack of time and manual process many of these checks are not performed. Additionally; new driver licenses called Enhanced Driver Licenses are being issued by states which incorporate RFID technology that has yet to be effectively harnessed by law enforcement when addressing some of the above inadequacies as it pertains to drivers and passengers.

Although not necessarily law enforcement in nature, a similar dynamic arises with parking meters and parking lots and in actions involving repossessions and vehicle towing enforcement activities, where the vehicles of violators can be overlooked or incorrect vehicles can be subject to violation or delinquency actions. Accordingly, there exists a need for a means by which license plate registrations, driver's license information, vehicle status and the like can be queried, accessed and verified without the time-consuming effort and error-prone processes afforded by current methods. While no known approaches exist for addressing the challenges of parking enforcement and repossession actions, several limited approaches have been proposed to address some of difficulties of verifying license plate numbers, such as U.S. Pat. Pub. No. 2005/0285743 to Weber, WIPO Pat. Pub. No. WO 2008/020771 to Roberts, and U.S. Pat. No. 7,096,102 to Parker Sr. and U.S. Pat. No. 8,089,340 to Cochran et al., each of which is hereby incorporated by reference in their entireties, but none of these approaches can automatically assist law enforcement and non-law enforcement in verifying license plate veracity, Vehicle Identification Numbers (VINs), driver license/state ID validity and driver (occupant) identity, and/or insurance validity. Moreover, none of these systems provide: for accessing the new Enhanced Driver Licenses (EDLs) in a contactless fashion, and furthermore, none of the known systems provide for analysis of all such data received to be automatically processed through a secure law enforcement portal that can access secure law enforcement databases such as NCIC, NLETS and CJIS, as well as any applicable private (non-law enforcement) databases to obtain insurance verification as well as parking and/or financial databases for private enforcement actions. Additionally, no known approach exists for provision of the above in a secure way such that the relevant law enforcement data is accessible only to law enforcement, and that any private enforcement data contained therein is accessible, only by authorized personnel, such as for example, parking and/or repossession agents.

Consequently, there exists a need for new capabilities and enhancements for existing products in the electronic tracking and database transmission and analysis industry.

SUMMARY OF THE INVENTION

The proposed invention therefore relates to a novel approach to verifying the identity and registration of vehicles and drivers through the use of an in-place RFID system. To this end, the inventive contemplates the use of novel RFID-enabled license plates or automobile vehicle identification tags and/or existing RFID-enabled (enhanced) driver licenses/state IDs as a means of securely communicating vehicle and driver information that can be accessed in a remote fashion by an authorized law enforcement operator through use of specialized software configured for receiving and validating the system through secure validation networks. In addition, the inventive system offers features which also make it advantageous in that, unlike known RFID license plate installations, it can offer the benefits of independent verification through specialized software that receives the transmitted information in such away so as to privately and securely verify the same against off-site motor vehicle, criminal, parking, and/or repossession/financial databases or other databases as needed. In affording the above, the present invention therefore provides for the following beneficial advances relating to: (1) Provision of a passive RFID license plate module for secure, remote communication of license plate numbers, state of issuance identifiers, and/or VIN numbers; (2) Provision of encryption of the same; (3) Provision of a secure reception module and associated software for receiving information from the aforementioned RFID license plate module, as well as from Enhanced Driver Licenses/State IDs with enabled RFID chips; (4) Provision of the aforementioned associated software with capability for automatically verifying the information received from the aforementioned RFID license plate module and/or from Enhanced Driver Licenses/State IDs, and for assessing any the existence of criminal flags related to either the subject driver and/or the subject vehicle for alerting law enforcement; (5) Provision of an optional repossession alert for vehicles through a proprietary repossession database when used by non-law enforcement; (6) Provision of an optional expired or authorized parking alert for parked vehicles in paid parking spaces when used by parking enforcement and/or parking lot owners. By contrast, no known system affords these advantages, and accordingly, the present invention overcomes the aforementioned and other disadvantages inherent in the prior art.

It is therefore an object of the present invention to provide a mobile interrogator module for remotely querying a plurality of integral wireless tracking and data dissemination devices for a motor vehicle, comprising a license plate affixed to the motor vehicle, EDLs, and VINs. The system provides for the wireless receiving, storing and dissemination of digital data as part of a motor vehicle license plate having a License Plate Identification (LPID) tag is disclosed, and for the wireless receiving and dissemination of digital data as part of a motor vehicle VIN tag (also termed herein as AUTOID tag) and EDL tags (also termed herein as EDLID tags) of occupants, including at least one driver within the subject motor vehicle. The apparatus allows for the querying of data typically associated with an AUTOID tag, such as a VIN and other information, while the EDLID tag may yield driver license/state ID number(s), addresses, state of issuance, driving restrictions and the like. The LPID would return information such as license plate number and state of issuance. Data would be passed wirelessly upon receipt of a valid request signal from a law enforcement vehicle or authorized RFID reader, from the subject motor vehicle and any occupants therein, to the law enforcement vehicle or authorized RFID reader. Using associated software, the received data would be analyzed after automatically passing through a secure law enforcement portal that can access secure law enforcement (offsite) databases such as NCIC, NLETS and CJIS, and in certain optional embodiments; can access any applicable state Department of Motor Vehicle (DMV) databases for registration information, and where available in other embodiments, for insurance verification through centralized insurance databases. Such reporting is viewed as a means to reduce data entry and eliminate errors, thus freeing the law enforcement officer or authorized agent to perform other duties, or perform multiple queries in the same time as it takes to perform one in a conventional manner, and also as a means of swiftly alerting law enforcement to the presence of known criminals and terrorists. Thus, the system offers both mobile hardware (interrogator with data analyzer, signal strength detector) and software for automatically verifying received data through offsite databases, for interacting with native (e.g., third party supplied) RFID tags (such as EDLs) (EDLID) and/or proprietary RFID tags, such as the supplemental integral wireless tracking and data dissemination device for a motor vehicle comprising a license plate having a License Plate Identification (LPID) and/or an Automobile Identification (AUTOID). An alternate embodiment provides for much of the same components described above, but with, instead of law enforcement querying capabilities, capabilities for possession (e.g. repossession agent) and parking purposes, utilizing centralized possession (financial/lender) databases or a parking databases, respectively.

BRIEF DESCRIPTION OF THE DRAWINGS

The advantages and features of the present invention will become better understood with reference to the following more detailed description and claims taken in conjunction with the accompanying drawings; in which like elements are identified with like symbols, and in which:

FIG. 7A is a spatial arrangement diagram of one illustrative master antenna of an interrogator as used when querying a subject automobile having an illustrative Radio Frequency Identification tag associated therewith;

FIG. 7B is an elemental functional diagram of one illustrative master antenna of an interrogator, and the Signal Strength Detector and Data Analyzer used for setting antenna angles and for assessing signal strength and for data analysis when assigning position coordinates as part of the triangulation process.

DETAILED DESCRIPTION OF THE EMBODIMENTS

Figure 1:
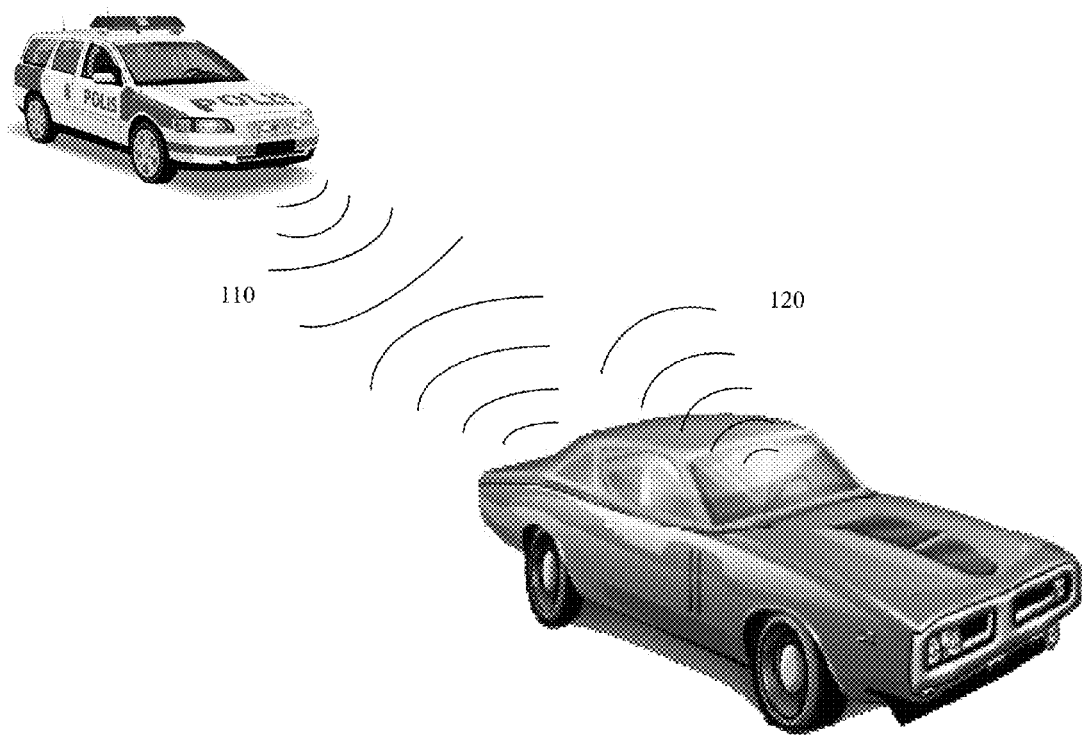
FIG. 1 is, a perspective view of a law enforcement vehicle with a wireless portal (interrogator) querying a subject automobile having a motor vehicle license plate with integral wireless tracking and data dissemination and an illustrative Radio Frequency Identification (RFID) enabled Enhanced Driver License Identification (EDLID) tag of an occupant (driver) situated therein according to one embodiment of the present invention.

It is envisioned that other styles and configurations of the present invention can be easily incorporated into the teachings of the present invention, and only one particular configuration shall be shown and described for purposes of clarity and disclosure and not by way of limitation of scope.

At its broadest level, the present invention relates to a wireless data dissemination and analysis system for identification of motor vehicles and drivers comprising: a mobile wireless interrogator unit connected to at least one centralized motor vehicle database and at least one centralized criminal database, the wireless interrogator unit having a visual based input/output display device and a master antenna; the master antenna being formed from a remote interfacing antenna unit for at least receiving Radio Frequency Identification (RFID) wireless signals from slave antennae of a plurality of motor vehicle and driver related RFID sources comprising at least: one Enhanced Driver License Identification (EDLID) (which collectively refers herein to, and may include, both enhanced driver licenses and enhanced state issued identification), one Automobile Identification (AUTOID) tag, and one License Plate Identification (LPID) tag, the remote interfacing antenna unit producing a complimentary radio frequency signal for interacting with the RFID wireless signals from the plurality of motor vehicle and driver related RFID sources in order to provide enhanced efficiency of secure law enforcement queries; the mobile wireless interrogator unit being provided on at least a law enforcement vehicle, and wherein mobile wireless interrogator unit is provided with a triangulation features that analyze the RFID wireless signals from slave antennae of a plurality of motor vehicle and driver related RFID sources and provides a spatially relative output in at least a two-dimensional spatial grid so as to depict a subject vehicle and any documented occupants therein in relation to both the law enforcement vehicle and in relation to position within said motor vehicle; the mobile wireless interrogator unit being further provided with a conversion feature for graphic depiction of the spatially relative output through a screen on the visual based input/output display device. Additionally, provision is made for the system to further comprise: a license plate unit for affixment to at least one motor vehicle, wherein the license plate unit comprises the at least one LPID tag having: an integral wireless tracking and data dissemination circuitry module that stores and processes secure transmittable data relating to at least a license plate number and/or registration related particulars of the at least one motor vehicle (registration information/tag verification); a slave antenna projecting from the license plate unit for receiving and transmitting digital information via a radio frequency signal; an enclosure affixed to the license plate unit, the enclosure housing at least the integral wireless tracking and data dissemination circuitry module; and a repeater in wireless connectivity with the slave antenna for redundant and/or augmented relaying RFID wireless signals from the plurality of motor vehicle and driver related RFID sources to outside of the at least one motor vehicle. The integral wireless tracking and data dissemination circuitry module may further include an RFID tag relating to registration information of the at least one motor vehicle and an RFID tag relating to a Vehicle Identification Number (VIN) of the at least one motor vehicle, and the integral wireless tracking and data dissemination circuitry Module may further include custom RFID tags relating to insurance policy information of said at least one motor vehicle and other user defined information as needed. Optional embodiments may alternatively provide for a wireless data dissemination and analysis system for identification of motor vehicles for parking and possession purposes comprising: a mobile wireless interrogator unit connected to at least one centralized database which may comprise at least one of the following of a centralized possession database or a parking database, the wireless interrogator unit having a visual based input/output display device and a master antenna; the master antenna being formed from a remote interfacing antenna unit for at least receiving Radio Frequency Identification (RFID) wireless signals from at least one slave antenna of a motor vehicle RFID source chosen from the group comprising: one Automobile Identification (AUTOID) tag, and one License Plate Identification (LPID) tag, or one parking tag, said remote interfacing antenna unit producing a complimentary radio frequency signal for interacting with the RFID wireless signals from the plurality of motor vehicle related REID sources in order to provide enhanced efficiency parking and possession queries; the mobile wireless interrogator unit being provided on at least an interrogator vehicle, and wherein mobile wireless interrogator unit is provided with a payment assessment features that analyze said REID Wireless signals from said slave antenna of a motor vehicle and provides a payment status (e.g., delinquent/repossession status) output of said motor vehicle; the mobile wireless interrogator unit being further provided with a conversion feature for graphic depiction of said spatially relative output through a screen on said visual based input/output display device for locating of the same in a parking lot or street environment. The LPID tag may optionally be provided with: an integral wireless tracking and data dissemination circuitry module that stores and processes secure transmittable data relating to at least a license plate number related particulars of said at least one motor vehicle for identification by parking agents and/or repossession agents; a slave antenna projecting therefrom for receiving and transmitting digital information via a radio frequency signal; an enclosure for enclosing said LPID tag, the enclosure housing at least said integral wireless tracking and data dissemination circuitry module; and a repeater in wireless connectivity with the slave antenna for redundant relaying RFID wireless signals from said LPID tag to outside of said at least one motor vehicle.

The AUTOID tag may be provided with: an integral wireless tracking and data dissemination circuitry module that stores and processes secure transmittable data relating to at least a Vehicle Identification Number (VIN) of the at least one motor vehicle; a slave antenna projecting therefrom for receiving and transmitting digital information via a radio frequency signal; an enclosure for enclosing the AUTOID tag, the enclosure housing at least said integral Wireless tracking and data dissemination circuitry module; and a repeater in wireless connectivity with said slave antenna for redundant and/or augmented relaying of RFID wireless signals from said AUTOID tag to outside of the at least one motor vehicle. The mobile wireless interrogator may be provided on at least one of the following of an authorized agent such as a repossession agent vehicle or a parking agent vehicle, and wherein the payment status output of the mobile wireless interrogator includes one of the following of a financial payment status or a parking payment status. Alternatively; the mobile wireless interrogator unit may be provided, instead of on say, a law enforcement vehicle, be situated as a fixed-position reader that while can be mobilized or moved to a temporary or longer-term fixed position site. In any case, it is worthy of note that the present inventions further provides for various other specific applications, depending on the need. For example, the present system can be applied to: (1) the tracking of registered sex offenders whereby they are required to place an RFID tag of the present invention in their car, so that when they are parked or driving around schools or other places of interest, law enforcement can place a fixed wireless interrogator to alert the police if a sex offender should come within the restricted areas area; (2) the tracking of convicted drunk drivers (and even certain commercial drivers) who receive court-ordered or other types of restricted licenses to drive to and from work with the condition being that they place an active tag that law enforcement can read and track quickly; and (3) for leased vehicles whereby the finance company requires placement of an RFID tag in the leased vehicle in case the vehicle needs to be located for repossession purposes.

Figure 2:
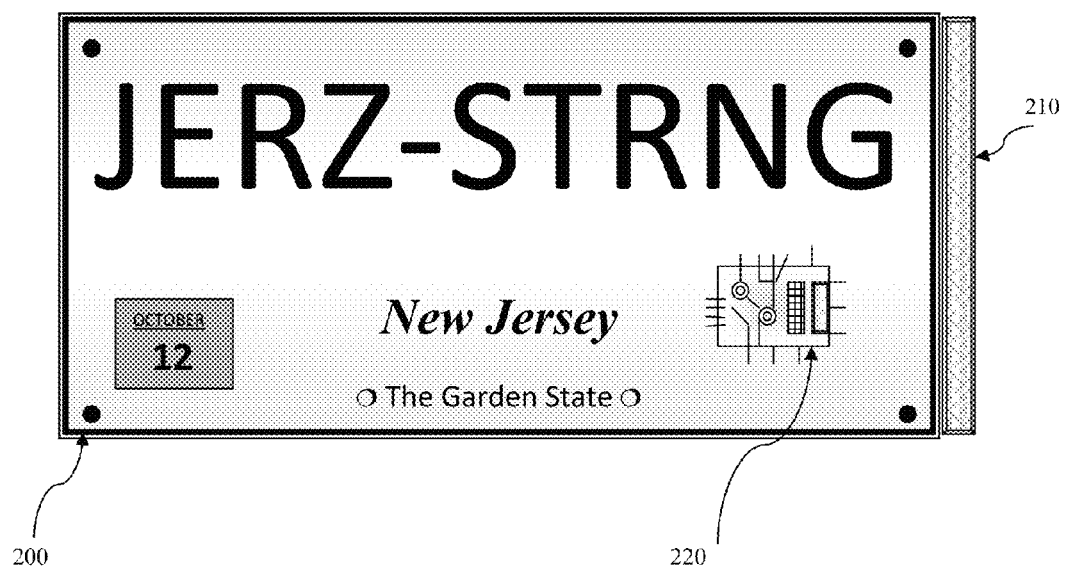
FIG. 2 is a detailed frontal view of the motor vehicle license plate with integral wireless tracking and data dissemination device having a License Plate (LPID) tag, according to one, embodiment of the present invention.

Referring to FIG. 1, an overall perspective of a law enforcement vehicle 110 with a wireless portal (interrogator, not specifically depicted in this particular figure) querying a subject automobile 120 having a motor vehicle license plate with integral wireless tracking and data dissemination aspect including an LPID tag (not specifically depicted in this particular figure) and an illustrative Radio Frequency Identification (RFID) enabled Enhanced Driver License Identification (EDLID) of an occupant (e.g., driver, not specifically depicted in this particular figure) situated therein according to one embodiment of the present invention. A plurality of equipped motor vehicles such as automobiles, trucks, busses, vans, or the like, are situated in a real world driving environment as would be found on everyday streets, roads, highways, parking lots, and the like. Although the central aspect of the present invention concerns the interrogator (as described hereafter) and its remote communications with a variety of RFID tags (wireless tracking and data dissemination components), and the subsequent verification and analysis of the data received therefrom, one additional novel aspect of the present invention concerns use of proprietary, novel RFID tags, such as the LPID tag provided on a motor vehicle license plate with integral wireless tracking and data dissemination as further described hereafter. At a general level, when the LPID is provided accordingly, it is capable of producing and receiving a radio frequency signal which would be of the frequency, protocol, and power level as approved by governing bodies, and which is envisioned to be of the digital packet variety; so as to allow for simultaneous and error-proof transmission. One possible frequency of use could be 9 MHZ, although many others could be employed, as described herein. A law enforcement vehicle 110 envisioned to be a municipal police officer, state officer, or a federal officer, is equipped with a querying (master) antenna (depicted in subsequent figures hereafter) which produces a complimentary radio frequency signal that can interact with the motor vehicle license plate With an LPID, as depicted in FIG. 2. It is envisioned that such data as social security numbers, insurance policy information, addresses, registration information, driving records, driving restrictions and the like, would be stored and processed by the various RFID tags described herein but the examples given are not intended as a limiting factor of the present invention. Due to the digital nature of the information being passed on the radio frequency signal and the complimentary radio frequency signal, any digital file such as photographs, sound files, text files and the like could be stored and transmitted, but is not intended as a limiting factor Of the present invention. Such information would result in faster vehicle registration and driver and passenger checks which not only frees the law enforcement officer up faster for more important duties, but results in less data entry mistakes, and would allow the officer to perform more random registration checks, which may permit the apprehension of more criminals, terrorists, and others hiding from the law. Such apprehensions would result in not only a safer environment for all, but would be an important benefit for homeland and/or world security.

Referring now to FIG. 2, is a detailed frontal view of the motor vehicle license plate 200 having a License Plate (LPID) tag 220, according to one embodiment of the present invention. A base structure envisioned to be manufactured from sheet metal or other material, provides the outward appearance of a conventional license plate, and the conventional license plate number is provided in the center of the base structure for, use in visual observation in the known manner. The base structure is held in place on the subject motor vehicle 120 (as seen in FIG. 1) by a series of four mounting holes, which are spaced and located to match the typical mounting requirements of a conventional license plate. A series of registration update sticker locations are located on the base structure to allow for visual indication of yearly registration updates. Such features provided by the base structure are enhanced by the present invention, as the present invention allows legacy systems which rely of the aforementioned features ea conventional license plate to remain in service, with the following modifications as described. An interface cable (not depicted) may be optionally provided in the case of use of active RFID-based LPIDs, to connect to the electrical supply system of the equipped subject motor vehicle 120. An electronics enclosure (not depicted) encapsulates and protects LPID 220 and any associated circuitry contained therein from environmental degradation and tampering. As encapsulated, LPID 220 may be securely affixed on the front side of the base structure motor vehicle license plate 200 so as to readily visible for visual inspection as needed, and furthermore, in some cases, may contain holographic strips, seals, stickers, or other manner of visually indicating the history of any physically tampering or removal of LPID 220 from/on motor vehicle license plate 200. Finally, a strip antenna 210 (also known as a slave antenna) may be provided, but other embodiments may simply provide for the slave antenna to be incorporated within the enclosure of LPID 220 itself. Strip antenna 210 is wired so as to be in contact with LPID 220.

RFID is wireless technology that uses Radio Frequency (RF) electromagnetic energy to carry information between an RFID tag and an RFID reader. The distance it will work over depends on RF transmit power, the receive sensitivity, the surroundings, how much Water is present, the orientation of the tag, frequency of operation and the care that goes into designing the products; planning and installing the system. Some RFID systems will only work over a few inches or centimeters while others may work over 100 meters (300 feet) or more. Both a reader and a tag have an antenna, herein termed a master antenna for the reader, and a slave antenna for the tag(s). To enable data communications each must be able to receive some of the transmitted RF energy from the other so the information can be recovered and used, from the RF carrier. There are various types of tags; i.e., passive; active and semi-passive tags such as self-charging RFID tags with long life as detailed, for example, in US Pat. Pub. No. 2008/0018466 to Batra et al., titled "Self Charging RFID Tag With Long Life", filed Jul. 20, 2006, the specification of which is hereby incorporated by reference in its entirety. Passive RFID tags do not have their own power supply and the read range is less than for active tags, i.e., in the range of about a few mm up to several meters. In one embodiment, provision is made for supplying a motor vehicle license plate with an integral wireless tracking and data dissemination device (e.g., LPID tag) that is passive; rather than active in nature. As mentioned, the LPID tag may be situated on a motor vehicle license plate as generally indicated in FIG. 2. Alternatively, Active RFID tags, on the other hand, must have a power source, and may have longer ranges and larger memories than passive tags. Many active tags have practical ranges of tens of meters, and a battery life of up to Several years. Another advantage of the active tags compared to the passive tags are that they have larger memories and the ability to store additional information (apart from the tag ID) sent by transceiver. For these reasons, one embodiment of the present invention described herein makes use of active RFID tags with a frequency range of 865.6-867.6 MHz, which utilizes an interface cable operatively coupling the LPID tag and associated circuitry to an electrical supply system of the motor vehicle, together with an over-current protective device for protecting the LPID and circuitry from overcharging. Accordingly, in one embodiment of the invention, provision may be made for motor vehicle license plate with integral wireless tracking and data dissemination device associated to be a LPID tag situated on a motor vehicle license plate as generally indicated in FIG. 2.

Figure 3:
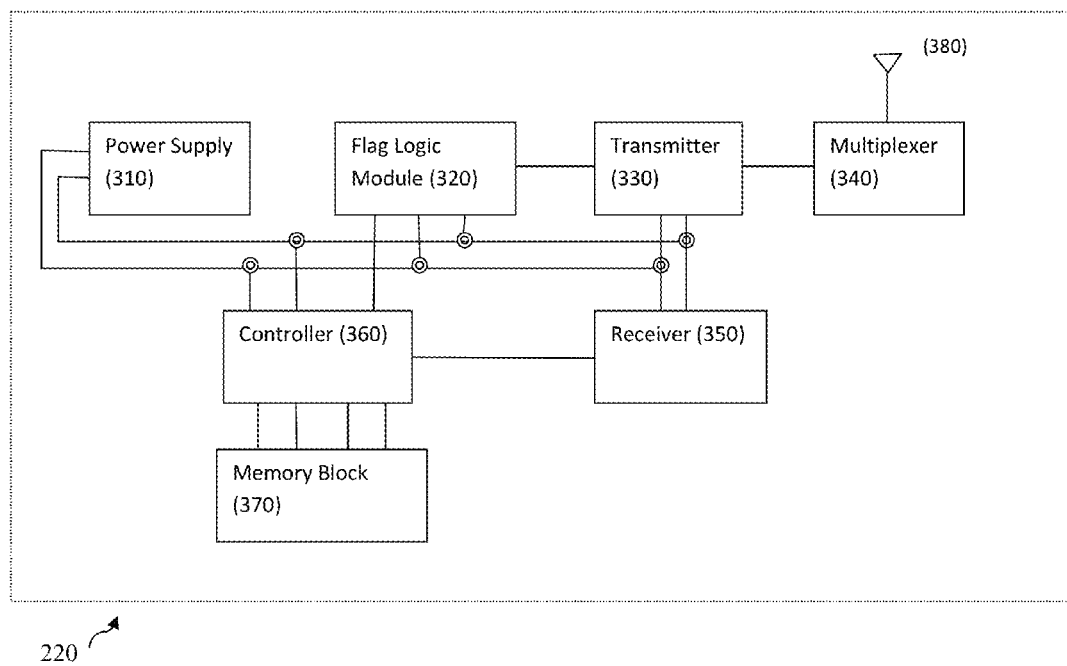
FIG. 3 is a functional interconnection diagram of illustrative circuitry associated with the LPID tag of the motor vehicle license plate with integral wireless tracking and data dissemination device.

Regardless of whether provisioned as an active, passive, or semi-passive tag, the present invention, provides in one illustrative embodiment, as depicted in FIG. 2, for an integral wireless tracking and data dissemination device for a motor vehicle comprising a license plate which include legacy system vehicle identification such as license plate numbers and registration information; a strip antenna projecting from the plate, the strip (slave) antenna 210 for receiving and transmitting digital information via a radio frequency signal; an enclosure for housing the LPID tag and associated circuitry of the LPID tag. Optionally, provision may be made for transmitter 330; receiver 350, multiplexer 340 for interacting with the strip antenna 220 (380) when transmitting and receiving digital information, and for transmitting received digital information to controller 360, and a memory block 370 for storing digital information of said motor vehicle and owner thereof, wherein optionally generated power bus signals are routed from the (optional, in the case of active RFID embodiments) power supply 310 to transmitter 330, receiver 350 and controller 360, as illustratively depicted in FIG. 3.

A central part of the inventive system is interrogator 560, which will include a master antenna 710 for querying by producing a complimentary radio frequency signal interacting with the strip (slave) antenna 220 so as so receive and transmit digital information therebetween. Because master antennae also receive signals, design considerations dictate that one must account for the gain in receptivity in order to effectively capture signals from the slave antenna 220 or other slave antennae of the AUTOID tags, EDLID tags, and/or through any repeaters used to repeat and amplify the transmission of the same to the master antenna: In order to recover data or ID information from a tag, the RF signal has to be stronger than any unwanted background electrical noise. If given signal is weak, a high-gain antenna (and a sensitive receiver for inputting of the received signal therefrom) may be required in order to capture more RF energy so as to recover data or ID information from the tag (as transmitted via the slave antenna). While choosing an RFID system with an RFID range of a hundred meters might seem attractive, the technology that enables this may not support some of other needs, such as minimizing costs by use of inexpensive passive tags. The working distance between a reader and a passive tag is greatest when they are in tune. The more closely the target RFID tag is 'tuned' to the reader (interrogator 560/master antenna 710) frequency; the stronger will be the overall signal. Thus, as will be discussed hereafter, certain design considerations are contemplated for embodiments of the master antenna within the present invention.

Master antenna 710, as depicted in FIGS. 7A and 7B, may therefore be chosen from several different types of antennae, depending on need. For example, a simple whip antenna radiates RF energy in most directions, while other types of antennae focus the radiation into a beam through the use of directors, such that energy is sent only toward the target RFID tags, and energy is not wasted by sending it in directions where there are no target RFID tags, thereby increasing the RFID range. To this end, the more directors an antenna has, the narrower, or more focused, is the beam. However, the narrower the beam, the more accurately the system must aim it, as the target area is smaller and the RFID tags have to be closer together. However, it is also important to note that augmenting the master antenna by adding a highly directional ability in order to focus all the reader power into a narrow beam for purposes of increasing the RFID range may mean that other radio receivers within the influence of this concentrated beam might also be influenced adversely. Furthermore, an intensely focused RF transmission from far away might overpower a weaker local RF signal. Thus, in one embodiment, master antenna 710 may need to have the power it transmits limited, and in any case, legal regulations, such as those found in the United. States, may limit the transmit power in the UHF band to 4 Was EIRP, wherein the EIRP is the Effective Isotropic Radiated Power and is the amount of focused power (the beam) transmitted from a directional antenna every second. Thus, if the antenna radiates in all directions (isotropically), 4 Watts input to the antenna would equate to an EIRP of 4 Watts output. However, if a master antenna focuses such an amount of energy into a beam that has, say 10× the intensity it would otherwise have, then the input to the antenna would effectively be radiating 4×10=40 Watts EIRP output in the beam, which might violate legal regulations in the resulting direction that the antenna is pointing. Accordingly, in one embodiment, master antenna 710 is designed to receive an input that accommodates local regulations and environmental and/or ambient considerations, yet provides sufficient power to remotely access the RFID tag of a subject car from a typical stand-off distance of a law enforcement vehicle.

Similarly, master antenna 710 is further designed in one embodiment to account for performance factors that may be manipulated through parameters such as frequency. Specifically, it is noted that the RFID range of the overall system is affected by the chosen operating frequency. Generally, the four most common Radio Frequency bands for RFID are:

Low Frequency (LF) 125 to 134 KHz band

High Frequency (HF) 13.56 MHz

Ultra High Frequency (UHF) 433 MHZ and 860 to 956 MHz band

Microwave Frequency 2.45 to 5.8 GHz band

The characteristics of each band affect the RFID range differently. In general, the higher the frequency, the greater is the range because RF radiation has more energy at the higher frequencies and as such, the RF field can influence RFID tags that are further away. Conversely, Lower frequencies (LF) usually mean shorter RFID range, given that such systems use the so-called Near Field Effect, which employs the magnetic component of electromagnetic energy, and this couples the tag and reader over only very short distances of typically up to half a meter, or just over a foot, but the effective range of such systems drops considerably, given that it is limited by the $1/r^2$ rule for such emissions. This effect limits the amount of power that can be transferred from the reader to the tag as they move further apart. This is significant if the tag does not have a battery and is relying on harvesting some of the radiated energy from the reader to power its microchip, such as for passive tags, which might range in frequency from 125 KHz up to 900 MHz: However the higher frequencies can introduce a different set of limitations because at higher frequencies the RF can be more easily obstructed or absorbed by objects in and around the line of sight between the reader and the RFID tags. To this end, the different wireless tracking and data dissemination tags within the present inventions may have different native frequencies, with the LPID tag availing itself of the widest range of frequencies assigned to it, and the AUTOID being the most limited in that it is generally not situated outside the subject vehicle, but may instead be situated substantially within the vehicle, thereby being especially subject to shielding and/or interference by plastic, metal, etc., in vehicles, especially at the higher frequencies.

Additionally, placement of the tags in the present invention is important for optimum efficiency. This is especially true for the License Plate Identification tag (e.g., LPID tag 220) aspect and also for the AUTOID tag where a repeater is not provided on the subject motor Vehicle, given that liquids such as water can absorb RF (especially at microwave frequencies) and metals can shield or reflect RF energy. Furthermore, the best RFID range when the tag is facing the reader, rather than being "edge-on". Accordingly, LPID tags 220 contemplated for the license plate aspect are positioned in a substantially vertical fashion; with further provision for two or more tags in each license plate positioned at right angles to each other. Similarly, master antenna 710 may include two or more reader/transmitter antennas at right angles to each other (as depicted in FIGS. 7A and 7B), so that if one tag is edge-on to one antenna (not specifically depicted), it will be facing the other, such that master antenna 710 may capture RFID transmissions better. Because RFID tags are prone to ineffective transmissions due to RF reflections, the present system contemplates use of RFID tag reading that is designed to minimize the effects caused by RF reflections. This is accomplished for any reflected signals that arrive at slightly different times by accounting for the fact that some signals take slightly longer paths (e.g., are multipath in nature) and are likely to take longer to reach the receiver of the interrogator, and adjusting for the same.

Figure 4:
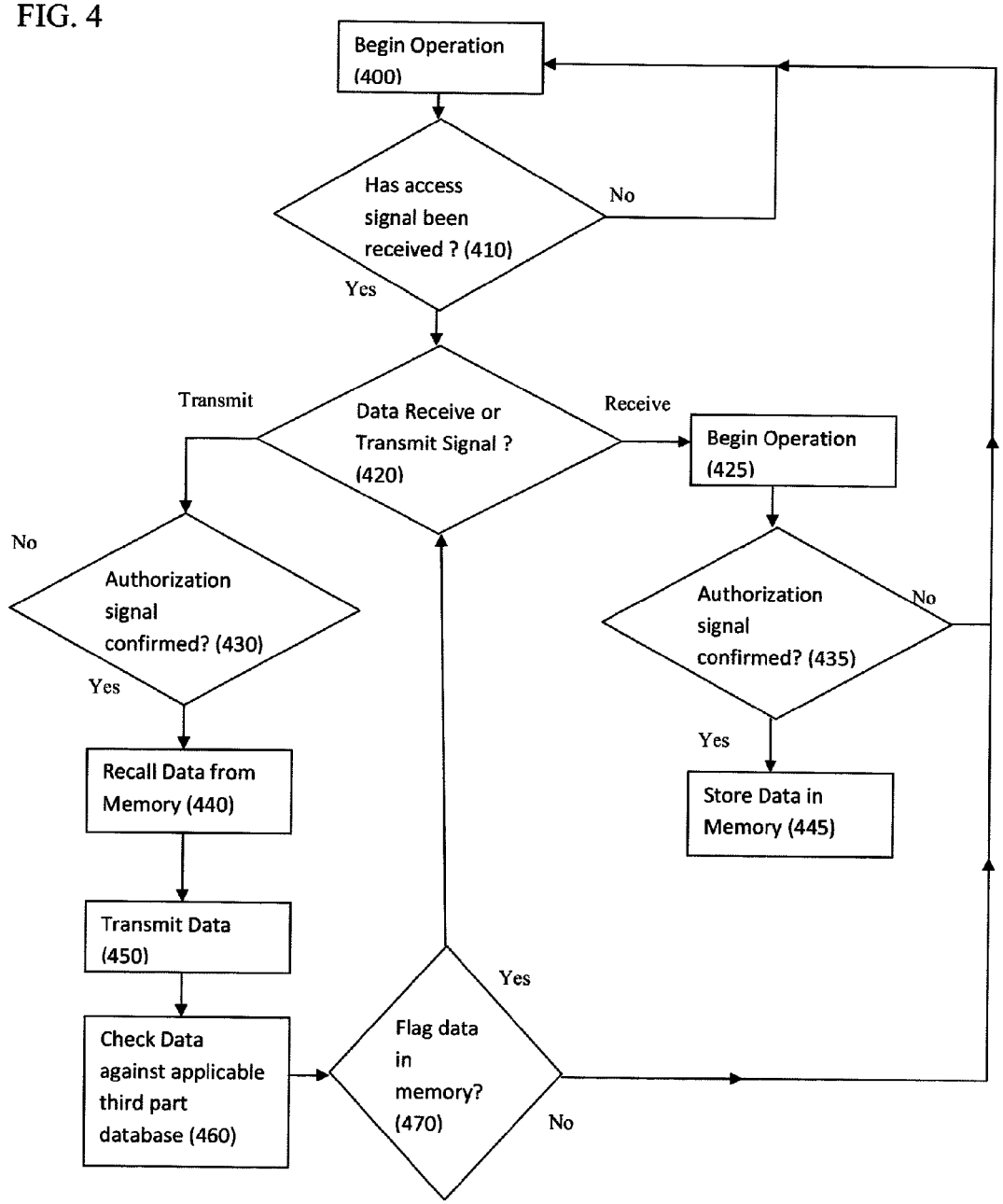
FIG. 4 is a functional logic diagram of one illustrative logic sequence as used with the data acquisition and dissemination portion of the motor vehicle license plate with integral wireless tracking and data dissemination device associated with the LPID tag.
Figure 5:
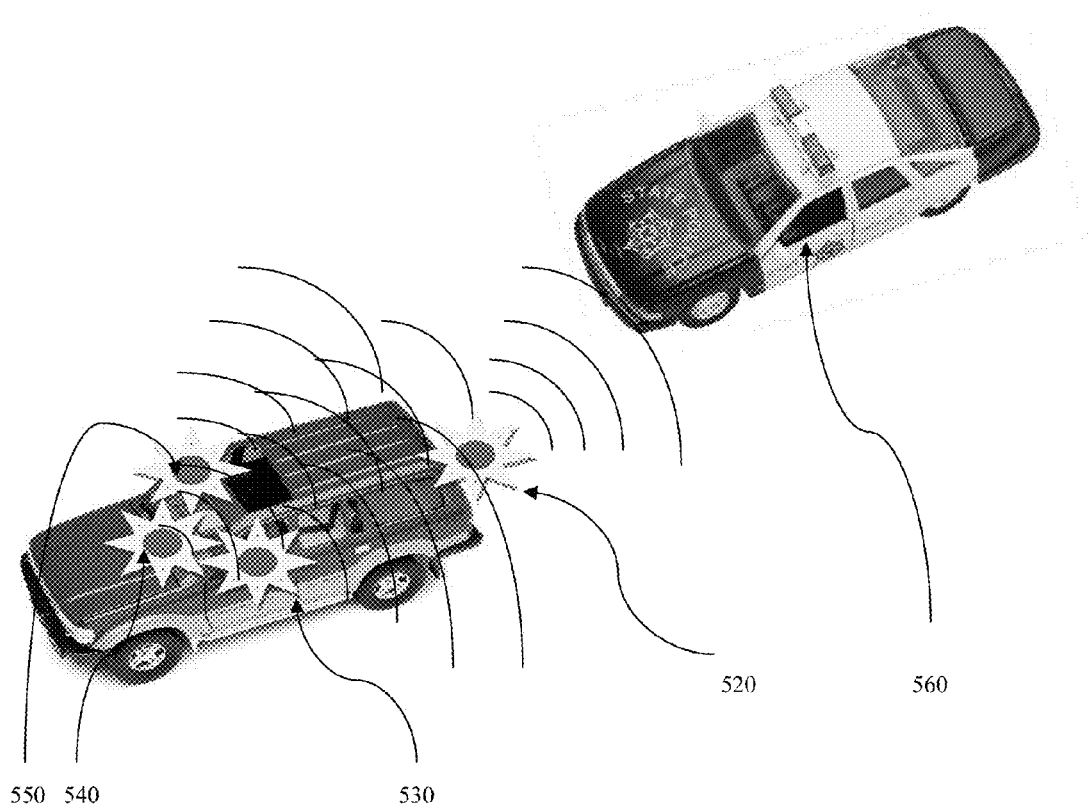
FIG. 5 is a perspective view of a law enforcement vehicle with a secure wireless portal (interrogator) querying a subject automobile having a motor vehicle license plate with integral wireless tracking and data dissemination, an illustrative RFID Enabled Driver License Identification of two illustrative occupants, and an Automobile Identification (AUTOID) tag situated, therein according to one embodiment of the present invention.

With reference to FIGS. 4 and 5, the present invention provides for interrogator 560, situated in a mobile fashion when portably installed on a law enforcement vehicle (or in an alternative embodiment, as a fixed location reader), to query a subject vehicle by interfacing with a plurality of data acquisition and dissemination (RFID) tags, such as novel RFID-enabled license plates (the signals of which are shown illustratively at 520 in FIG. 5) or automobile vehicle identification tags (the signals of which are shown illustratively at 540 in FIG. 5) and/or existing RFID-enabled (enhanced) driver licenses for occupants (550) if any, and a driver 530, and the like. Although this may be accomplished in several ways, one embodiment is depicted herein specifically to FIG. 4, which details a functional logic diagram of an illustrative logic sequence as used with above-referenced plurality of wireless tracking and data dissemination when queried by interrogator 560. The logic begins at a first functional block 400, whereupon interrogator 560 attempts to activate at least one of the available wireless tracking and data dissemination tags, whether LPID, AUTOID, and/or EDLID tags until a response a response has been received at 140. The request for the tracking and data dissemination tags to transmit data to interrogator 560 will be authenticated by provision of an encrypted access code at 140 in order to eliminate the possibility of hacking or other unauthorized access. In one optional embodiment, provision may also be made for interrogator to have the tracking and data dissemination tags receive, in cases where law enforcement has a need to flag any operational notes to the tags, data at 425, whereupon after an encrypted authorization (to write) signal is confirmed at 435, so that any flags (notes) may be stored in memory at 445. In most cases, however, the presently described logic sequence will involve the tracking and data dissemination tags transmitting data to interrogator 560 upon interrogator 560 receiving an authorization signal confirmation at 430, thereby completing the two-way challenge and response "handshake" that confirms the identity of the access (e.g., the access signal Of an authorized law enforcement interrogator 560, at 410). In the case of a improper authority from either the interrogator (e.g., non-authorized access party) or the tracking and data dissemination tags (e.g., from neighboring vehicles or other ambient RFID tags), then the process either reverts to the first functional block 400 (in the case: of the former situation), or disregards the extraneous signals received (in the case of the latter). Although not specifically depicted herein, the disregarding of extraneous signals received serves to ignore both ambient or unwanted RFID signals that may have been inadvertently activated by interrogator 560, and also serves to prevent fraud by disregarding and/or flagging any tracking and data dissemination tags that have dissimilar authorization signals (code sequences), such as might occur when a criminal swaps out a LPID tag or AUTOID tag on a given vehicle. This is accomplished by assigning in the circuitry of least the LPID or AUTOID tags with similar authorization signals that contain a common string within a code sequence for identification and access, such that upon reception of the same at interrogator 560, a comparison is made to ensure that the LPID tag or AUTOID tags are related and in fact belong to the vehicle upon which they are affixed. Such security may further be augmented in additional embodiments by providing for Physical Unclonable Functions (PUFs) as secure memory for the storing of a secret key on each RFID tag. In any case, the security aspect, as well as the remaining steps of transmitting of data to interrogator 560 in the present logic sequence may involve recalling data from memory 440, transmitting data 450 (such as driving records, addresses, driver information, registration, license plate number, VIN, etc.) to interrogator 560, whereupon the software or interrogator 560 checks data 470 from the off-site databases as described herein. It is noted that one approach to automated inquiries of received data, and the analysis thereof, may be done through commercially available software such as that available in the Info-Cop® brand software, Info-Corp® brand software all of which is available from GTBM Inc. of East Rutherford, N.J., and which can access off-site databases 730, such as CJIS, NCIC, and for non-security uses (e.g., parking and possession purposes), parking and financial (repossession) databases can also be accessed with similar automation software available from the GTBM company. Usage of the above software may also provide for non-law enforcement security agents to access some of the same functionality available to law enforcement, including allowable automated checks of driver licenses and license plates for the presence of criminal actors and/or terrorists.

Encryption, such as DTS RIFD encryption available from Texas Instruments of Dallas, Tex., or any other EPC Class 1, Generation 2 type encryption known in the art may be employed for all tracking and data dissemination tags and for transmissions of data to and from interrogator 560. Such encryption, as well as the assigning of manufacturer programming of tags with access codes and/or code sequences for identification and access may be done by the manufacturer of the tracking and data dissemination tags, or by other parties, such as vehicle manufacturers (e.g., especially for AUTOID tags), or by state DMV agencies who can assign the same to EDLID tags and/or LPID tags. As a way of augmenting the above-described encryption, it is also desirable in some embodiments to provide the aforementioned authentication by way of certain means that address the limits that may exist in some encryption protocols. Authentication is a process of confirming the identity claimed by an entity. In the context of a tamper-resistant authentication protocol for an RFID system, the tag, and reader establish a trusted relationship and agree on a common, secret, session key to secure the communication between them. It is not difficult to develop a trusted authentication protocol to make high-cost RFID tags directly authenticate RFID readers. However, the majority of RFID applications use low-cost and high-volume passive tags. Under this circumstance, developing a secure authentication protocol is a challenge because tags (especially passive/low cost RFID Tags), compared with readers and back-end servers, are highly resource-limited and typically cannot perform strong encryption. In order to solve this problem, various lightweight authentication algorithms and protocols have been proposed, debated, and tested. One such approach that might be employed in one embodiment is the pseudonym technique has been proposed to deal with this problem in low-cost RFID systems: each tag stores a list of pseudonyms that can only be understood by authorized verifiers. When the tag is queried, it emits the next pseudonym from the list. Since the protocol uses only an XOR (binary exclusive OR) operation and does not require the tag to perform any cryptographic operations, it fits with the restrictions of the low-cost RFID tags very well. A problem is that the tag can only store a small list of pseudonyms because of its small data capacity. One method used to solve this problem is renewing the list each time when the tag is queried. However, to allow the list to be renewed, a mutual authentication protocol is required between the tag and the reader to prevent an attacker from updating the list. An alternative approach is termed Yet Another Trivial RFID Authentication Protocol (YA-TRAP)

and accomplishes RFID authentication by use of monotonically increasing timestamps and a keyed hash to distinguish anonymous (adversary) tags from legitimate tags. In the beginning, a reader sends the current system time to a tag. The tag decides if the time is valid by checking if it is in the interval between the stored timestamp and a maximum system allowable timestamp. If the received time is valid, the tag will use it to update the stored timestamp and send the key-hashed timestamp to the reader. Otherwise, the tag will send a pseudo-random number to the reader. The information is forwarded to the Backend system that maintains a hash lookup table and is able to quickly compare the values to validate the tag. Modified authentication protocols, such as O-TRAP and YA-TRAP+, have also been proposed in the art. The protocol OTRAP stands for "Optimistic" Trivial RFID Authentication Protocol, i.e., the security overhead is minimal when the parties are honest. O-TRAP is a revision of YA-TRAP with added one-pass anonymity for authenticated transponders and solves some vulnerabilities of YA-TRAP, YA-TRAP+ can improve Security by introducing an extra optional pass in which a server authenticates the timestamp. A major drawback for both O-TRAP and YA-TRAP+ is that the server workload is increased so that more computational resources are required on a per-tag basis for authentication. Yet one additional approach contemplated are what is known in the art as the Hopper and Blum (HB) human-to-computer authentication protocols, which involve extremely low computational cost makes the protocol well suited for resource-constrained devices like RFID tags. Unlike other classical symmetric key cryptography solutions, the security of the HB protocol is based on the hardness of the Learning Parity with Noise (LPN) problem: A random k-bit binary vector is generated by the reader and transmitted to the tag for challenge. The tag computes the inner dot product of the k-bit vector and a shared key, and XORs the value with a noise bit (=1 with probability $\eta \epsilon [0, \frac{1}{2}]$). The calculated value is sent back to the reader for checking to result in a pass or fail. This is one round of HB authentication with the same process being repeated several times. Similarly, HB+ (and its related protocol, HB++) may secure RFID tags by employing an additional shared key so that the tag and reader share two independent keys (instead of using one shared key in the HB protocol) together with a random "blinding vector" that is generated by the tag at the beginning of the process and is used in calculations later on. In HB+, a basic authentication step consists of three rounds. First, the tag sends a random "blinding factor" to the reader (interrogator 560) that would reply with a random challenge in the same way as HB Protocol. Finally, the tag calculates a return value that is the inner dot product of the newly introduced key and blinding vector XORs, with the HB return signal as before, and replies with it to the reader.

Figure 6:
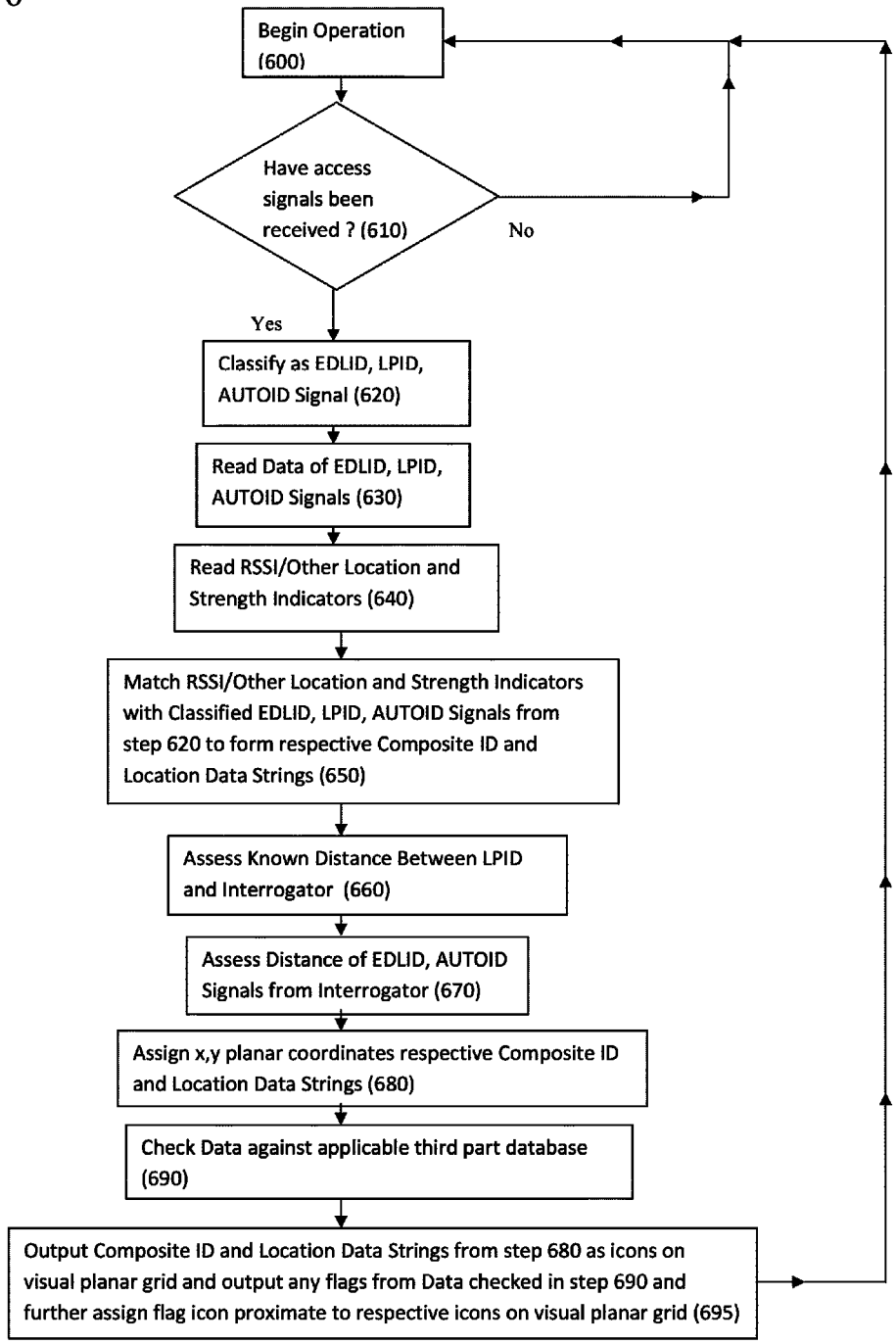
FIG. 6 is a functional logic diagram of one illustrative logic sequence for sequencing a triangulation (trilateralization) as used with the motor vehicle license plate with integral wireless tracking and data dissemination device associated with the LPID tag, AUTOID tag, and/or EDLID.
Figure 8:
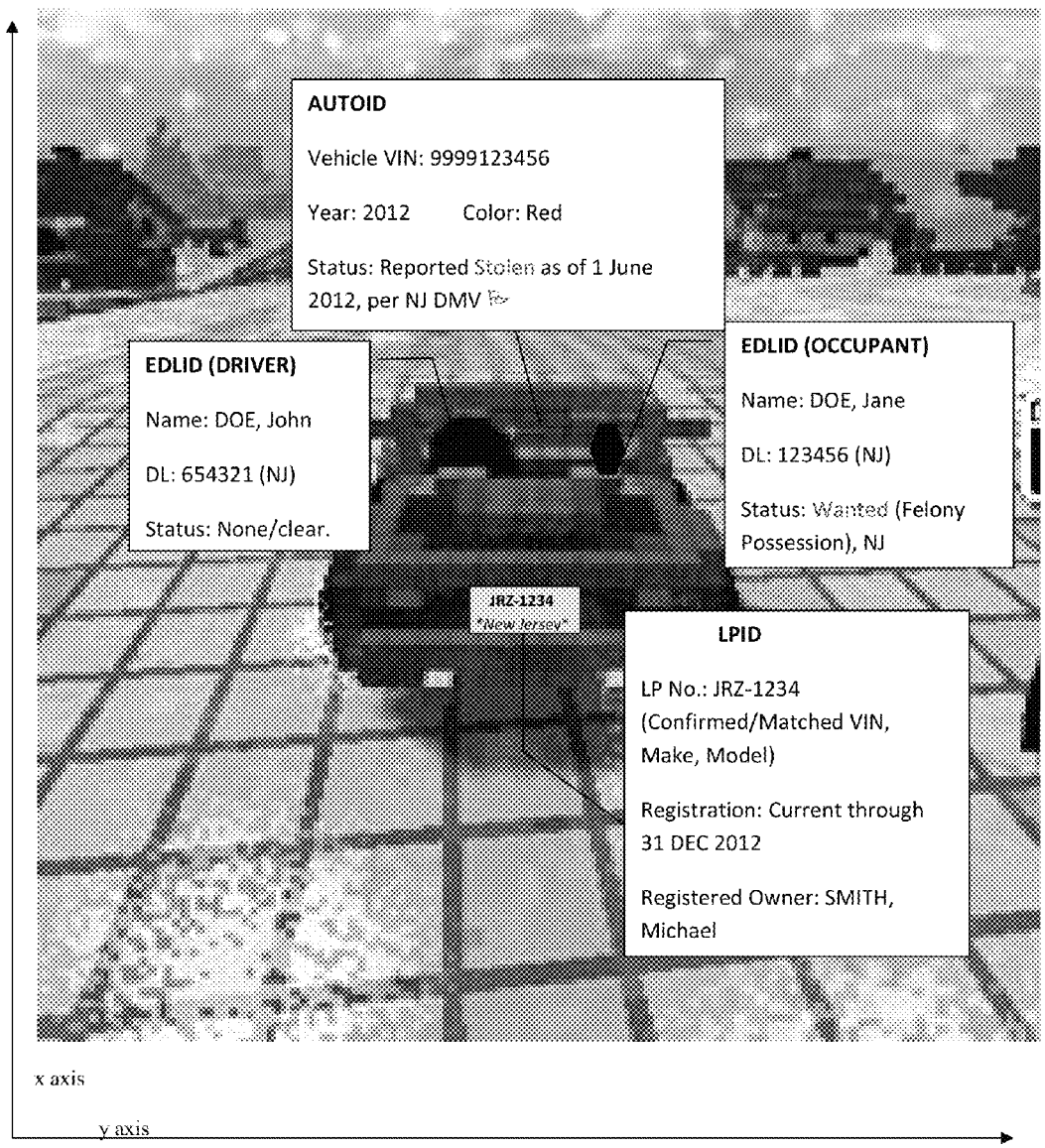
FIG. 8 is an illustrative depiction Of an x, y grid of the screen of graphic depiction feature of the spatially relative output on the visual based input/output display device, featuring the graphic outputting of some of the text resulting from a verification and analysis by offsite databases Of received data.

One embodiment of the present invention provides for additional functionality wherein the results of the above referenced automated verification and analysis of data received by interrogator 560 by associated software are presented on a visual based input/output display device (such as a computerized monitor or the like), and in one specialized embodiment, are presented in a spatially rendered visualization graphic, as illustratively depicted in FIG. 8. Specifically, this involves a software-based conversion (the illustrative steps of which are shown in FIG. 6) feature of interrogator 560 that offers the graphic depiction of spatially relative output through a screen portion of the visual based input/output display device, and is predicated on a novel triangulation as described hereafter. Accordingly, with specific reference to FIG. 6, the logic sequence in providing one embodiment of the spatially relative output starts at step 60Q, and an assessment is made at step 610 as to whether access signals have been received, after Which the signals received are classified as to whether they are EDLID, LPID, or AUTOID signals at 620. Once classified, the data of the respective signals is read (and verified as needed) at 630, thereafter at step 640 location including direction is assessed, and Matched at step 650 with the respective EDLID, LPID, or AUTOID tag signals to form respective composite ID and location strings that can be associated with the respective data received. With the use of ultrasonic, laser, or other type of pings, distance calculations can be made to assess the distance between the LPID (e.g., accomplished by emitting a beam from the law enforcement vehicle for reflection off of license plate 200 or the rear bumper of subject vehicle 120) and Interrogator 560 (master antenna 720), so as to establish that value as a known quantity that may assist in deriving and/or confirming at step 720 the distance of the EDLID, LPID, or AUTOID tags from master antenna 720. From each respective distance obtained thereof, it is possible to triangulate the relative position of each EDLID, LPID, or AUTOID tag, to each other in relation to master antenna 720 in order to form a spatially relative output. Such positions may each be expressed as x, y planar coordinates indicative of position on the planar grid for graphic depiction on the visual based input/output display when associated with the composite ID and location data strings referenced above. Note that typically the planar grid should be assigned a spatial orientation that is substantially parallel to the ground, level or some other reference point in order to orient the planar coordinates for displaying. Alternatively, the visual rendering (conversion feature for graphic depiction) may be done in accordance with other approaches, such as that found described in U.S. Pat. No. 7,856,370 to Katta et al., titled "Method and System for Displaying Predictions on a Spatial Map" the entirety of which is hereby incorporated by reference herein. In any case, associated with such positions is the verification and analysis at step 690 of data received by master antenna 720, after processing by off-site databases 730, the result of which may, in one embodiment; be output into rapidly readable/usable formats, such as the exemplary data callouts seen in FIG. 8, which show text indicating the verified and analyzed data for each spatially situated graphic icon rendered in the screen far each EDLID, LPID, or AUTOID tag, at step 695. It is noted that the above described output on the screen of visual based input/output display device may include touch screen capability for inputting information relative to each tag, such inputs including requests for additional data detail, as well as for updating of memory block 370 of a given EDLID, LPID, or AUTOID tag with additional flags or notes, where deemed desirable in certain alternative embodiments.

The novel triangulation contemplated within the present invention is enhanced through the derivation of the value of tracking and data dissemination tags and the interrogator antenna. One challenge overcome by the present invention relates to scenarios where there the distance between the tracking and data dissemination tags and the interrogator antenna is not readily discernible. The distance between the tracking and data dissemination tags and the interrogator antenna can be an important factor for deriving an accurate graphic depiction of spatially relative output. One approach is to, employ a novel use of an advanced interrogators such as the Wavetrend® RX2100 reader available from Wavetrend USA of Fairfax, Va. so as to use a received signal strength indicator (RSSI), a circuit that measures the strength of an incoming signal, to estimate the distance. When used a such, the distance between police vehicle 110 (interrogator 560/ master antenna) and subject vehicle 120 (tracking and data dissemination tag (s)/slave antennae) can be measured through many different traditional distance finding means such as ultrasonic means, laser range finders, or other approaches, but in one illustrative embodiment, it may ascertained through use of an electromagnetic wave-based approach described in U.S. Pat. No. 5,828,443, titled "Distance Measuring Apparatus", to Fujioka et al, filed on Feb. 27, 1996, the entirety of which is hereby incorporated by reference. In other embodiments, distance calculations involving an ultrasonic or other type of ping might be used to determine the roundtrip distance/time involved from transmission by the interrogator to one or more RFID tags. In yet a further alternative embodiment, a distance-sensing reader technology based on time of flight of the transmitted signals may be employed. Such an approach would measure the time intakes for a radio wave to travel from the reader antenna to the tag antenna and back to the reader. The distance from the reader to the tag is calculated based on the travel, speed of a radio wave in the speed of light (approximately 300,000 kilometers per second). However, one challenge in this approach is to differentiate the weak backscatter signal of a particular tag from the backscatter signal of other RFID tags and the environment. To address these problems, a modulation technique called direct-sequence spread spectrum may be employed in this particular alternative embodiment. Instead of sending a continuous wave during reader-to-tag talk, interrogator 560 would send a pseudorandom sequence signal to the RFID tag. The selected tracking and data dissemination tag modulates the signal using backscatter, and a measurement is made of the time between sending the sequence and receiving an echo signal from the RFID tag. Because the radio-wave speed is a constant, one can calculate the distance of tag based on that delay, and if required, interrogator 560 can be set to interrogate only rags within this distance. Normally, the maximum distance that can be measured using this technique is the same as the read distance, which is determined by the sensitivity of both the tracking and data dissemination tag(s) and interrogator 560. However, depending on noise factors, in some cases the maximum distance of measurement might be a fraction of the read range in order to maximize results. In either case, when provisioned as such, distance measurement accuracy of about 0.5 meter can be effectuated, and if a pseudorandom sequence is employed, it is possible to achieve 20-centimeter accuracy, especially when employing commercial Electronic Product Code (EPC) generation 2 interrogators and tags with distance measurement capability.

In yet another alternative embodiment, the system and method uses, within interrogator 560, a distance calculator to efficiently and accurately determine the location of each of the tracking and data dissemination tags within or on the subject vehicle. Interrogator 560 would transmit a plurality of signals to a given tracking and data dissemination tag, with the plurality of signals having different fundamental frequencies. In response, the tracking and data dissemination tag backscatter modulates the plurality of transmitted signals to create a plurality of backscatter modulated signals. Interrogator 560 receives and demodulates the plurality of backscatter modulated signals. The distance calculator determines the phase of the plurality of backscatter modulated signals and determines a rate of change of the phase in the backscatter modulated signals with respect to the rate of change in the fundamental frequency of the transmitted signals and uses this information to calculate the distance to the tracking and data dissemination tag. Using the calculated distances from the given tracking and data dissemination tag and the known location of interrogator 560, an accurate location can be determined using trilaterization (triangulation) techniques, something which can be repeated for each respective tracking and data dissemination tag so that at least an appropriate x, y set of coordinates may given out for each (based on the identifying data that indicates the type and identity of the given tracking and data dissemination tag) for mapping thereof respectively on a planar grid (as illustratively seen in FIG. 8) so that it can be represented on the visual based input/output display device (screen) as part of the aforementioned graphic depiction of spatially relative output. Thus, the system and method is able to efficiently determine an accurate location for each tracking and data dissemination tag attached to or otherwise associated with a subject motor vehicle, in spatial relation to interrogator 560 and in relation to each other, whether AUTOID, EDLID, and/or LPID. Provision of such can be very helpful in assisting law enforcement to know whether say, a wanted criminal holding an EDL is seated in the back or the front position of a subject motor vehicle. Additional specifics further relating to this and other alternative embodiments pertaining to this approach may be employed as further discussed in U.S. Pat. No. 7,119,738, titled "Object Location System and Method Using RFID" to Bridgelall, et al., issued on Oct. 10, 2006, the entirety of which is hereby incorporated by reference herein, as well as in U.S. Pat. No. 7,693,681, titled "System for Determining Three Dimensional Position of Radio Transmitter" to Yamada, issued on Apr. 6, 2010, the entirety of which is hereby incorporated by reference herein.

Furthermore, in some embodiments involving triangulation or other techniques, it may be advantageous to employ directional antennae, such as the illustrative orthogonal array antennae illustratively depicted in FIGS. 7A and 7B. The location sensing in this work uses the triangulation principle with the bearing measurements. This can be achieved by loop antennae (dual directional antenna system) that exploit their respectively configured directionality, and overcoming shortcomings that may present themselves when using a single directional antenna. The dual antenna embodiment might comprise a set of antennas of two identical loop antennas proportionally positioned to each other so that a 90 degree phase shift occurs between life received signal at two antennas, thereby affording a parameter that may be defined as the ratio of the received signal strength of one antenna to that of the other antenna. As specifically detailed in FIG. 7B, the illustrative dual antenna RFID embodiment may comprise at least two directional antennas and the shared power detector. The power detector has two identical signal strength detectors and a data analyzer. An RF signal received at each antenna may be fed to the signal strength detector, which converts the signal within an illustrative range of $-120$ dBm to $-45$ dBm to a DC voltage with a range of 0 to 5 V. This DC voltage is transmitted to the data analyzer that generates the digitalized signal strength and ID code of the transponder. Finally, the generated signal strengths and identification code, together with an antenna facing angle can be provided to interrogator 560 through a serial communication interface (not depicted). When provisioned as such, the direction of a given target transponder (e.g., tracking and data dissemination tag) can be determined by the ratio of the signal strength of the two. Such an exemplary arrangement affords the advantage of being robust in the face of a wide variety of signal distortions in a real environment.

When provisioned in accordance with the above, the present invention can be utilized by the average user in a simple and effortless manner with little or no training. The features and benefits of the motor vehicle license plate 200 with integral wireless tracking and data dissemination tag (LPID tag 220) are transparent to the normal owner and/or user of the subject motor vehicle 120. To use the present invention, any law enforcement vehicle 110 (or fixed RFID reader) with the necessary interrogator 560 and master antenna 720 could query any equipped subject motor vehicle 120 at any time. Such querying would be the result of a legitimate traffic stop, or of a random nature, should the law enforcement officer be looking for invalid registrations, illegal aliens, criminals, outdated insurance policies or the like. Should Such an event take place, the querying master antenna 720 on the law enforcement vehicle 110 would provide, through use of the automation software described, the received data from each respective integral wireless tracking and data dissemination device tag (LPID/EDLID/AUTOID tags) to allow for transmission to databases 730, which would verify and where analyzed, possibly flag data to indicate driving record violations, criminal records, immigration violations, stolen vehicle status, etc. to the law enforcement, either in a text alert, and/or as a visual (icon based) flag on the screen of graphic depiction feature of the spatially relative output on the visual based input/output display device.

The foregoing descriptions of specific embodiments of the present invention have been presented for purposes of illustration and description. They are not intended, to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A wireless data dissemination and analysis system for identification of motor vehicles and drivers comprising:
    a mobile wireless interrogator unit connected to at least one centralized motor vehicle database and at least one centralized criminal database, said wireless interrogator unit having a visual based input-output display device and a master antenna;
    said master antenna being formed from a remote interfacing antenna unit for at least receiving Radio Frequency Identification (RFID) wireless signals from slave antennae of a plurality of motor vehicle and driver related RFID sources comprising at least: one Enhanced Driver License Identification (EDLID), one Automobile Identification (AUTOID) tag, and one License Plate Identification (LPID) tag, said remote interfacing antenna unit producing a complimentary radio frequency signal for interacting with said RFID wireless signals from said plurality of motor vehicle and driver related RFID sources in order to provide enhanced efficiency of law enforcement queries;
    said mobile wireless interrogator unit being provided with triangulation features that analyze said RFID wireless signals from slave antennae of a plurality of motor vehicle and driver related RFID sources and provides a spatially relative output in at least a two-dimensional spatial grid so as to depict a subject vehicle and any documented occupants therein in relation to both said wireless interrogator unit and in relation to position within said motor vehicle;
    said mobile wireless interrogator unit being further provided with a conversion feature for graphic depiction of said spatially relative output through a screen on said visual based input-output display device.

2. The system of claim 1, further comprising:
    a license plate unit for affixment to at least one motor vehicle, wherein said license plate unit comprises said at least one LPID tag having:
       an integral wireless tracking and data dissemination circuitry module that stores and processes secure transmittable data relating to at least a license plate number related particulars of said at least one motor vehicle;
       a slave antenna projecting from said license plate unit for receiving and transmitting digital information via a radio frequency signal;
       an enclosure affixed to said license plate unit, said enclosure housing at least said integral wireless tracking and data dissemination circuitry module; and
       a repeater in wireless connectivity with said slave antenna for redundant relaying RFID wireless signals from said plurality of motor vehicle and driver related RFID sources to outside of said at least one motor vehicle.

3. The system of claim 2, wherein said integral wireless tracking and data dissemination circuitry module further includes an RFID tag relating to registration information of said at least one motor vehicle and an RFID tag relating to a Vehicle Identification Number (VIN) of said at least one motor vehicle.

4. The system of claim 3, wherein said integral wireless tracking and data dissemination circuitry module further includes an RFID tag relating to at least one of the following of:
    i. insurance policy information of said at least one motor vehicle, or
    ii. user defined information.

5. The system of claim 4, wherein said mobile wireless interrogator unit is provided on a law enforcement vehicle or as a fixed-position reader.

6. A wireless data dissemination and analysis system for identification of motor vehicles for parking and possession purposes comprising:
    a mobile wireless interrogator unit connected to at least one centralized motor vehicle database and at least one of the following of a centralized possession database, registration information database, or a parking database, said wireless interrogator unit having a visual based input-output display device and a master antenna;
    said master antenna being formed from a remote interfacing antenna unit for at least receiving Radio Frequency Identification (RFID) wireless signals from at least one slave antenna of a motor vehicle RFID source chosen from a group comprising: one Automobile Identification (AUTOID) tag, and one License Plate Identification (LPID) tag, or one parking tag, said remote interfacing antenna unit producing a complimentary radio frequency signal for interacting with said RFID wireless signals from said plurality of motor vehicle related RFID sources in order to provide enhanced efficiency of parking and possession queries;
    said mobile wireless interrogator unit being provided on at least an interrogator vehicle, and wherein mobile wireless interrogator unit is provided with a payment assessment features that analyze said RFID wireless signals from said slave antenna of a motor vehicle and provides a payment status output of said motor vehicle;
    said mobile wireless interrogator unit being further provided with a conversion feature for input-output display device;
       wherein said LPID tag is provided with;

an integral wireless tracking and data dissemination circuitry module that stores and processes secure transmittable data relating to at least one of the following of a license plate number related particulars of said at least one motor vehicle or registration information;

a slave antenna projecting therefrom for receiving and transmitting digital info a ton via a radio frequency signal;

an enclosure for enclosing said LPID tag; said enclosure housing at leas said integral wireless tracking and data dissemination circuitry module; and a repeater in wireless connectivity with said slave antenna for redundant relaying RFID wireless signals from said LPID tag to outside of said at least one motor vehicle.

7. The system of claim 6, wherein said AUTOID tag is provided with:

an integral wireless tracking and data dissemination circuitry module that stores and processes secure transmittable data relating to at least one of the following of a Vehicle Identification Number (VIN) of said at least one motor vehicle or registration information;

a slave antenna projecting therefrom for receiving and transmitting digital information via a radio frequency signal;

an enclosure for enclosing said AUTOID tag, said enclosure housing at least said integral wireless tracking and data dissemination circuitry module; and a repeater in wireless connectivity with said slave antenna for redundant relaying RFID wireless signals from said AUTOID tag to outside of said at least one motor vehicle.

8. The system of claim 7, wherein said mobile wireless interrogator is provided on at least one of the following of an authorized repossession agent vehicle or a parking agent vehicle, and wherein said payment status output of said mobile wireless interrogator includes one of the following of a financial payment status, registration information or a parking payment status.

* * * * *